US011535090B2

(12) United States Patent
Dean et al.

(10) Patent No.: US 11,535,090 B2
(45) Date of Patent: Dec. 27, 2022

(54) SYSTEMS AND METHODS FOR MITIGATING WIND THROB IN VEHICLES

(71) Applicant: Ford Global Technologies, LLC, Dearborn, MI (US)

(72) Inventors: William Dean, Plymouth, MI (US); Richard A. Kreder, Northville, MI (US); William S. Gulker, Oakland, MI (US); Chris Murray, Beverly Hills, MI (US); Ibaa Al hayek, Ferndale, MI (US); Newton A. G. Filho, Bahia (BR)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 16/945,678

(22) Filed: Jul. 31, 2020

(65) Prior Publication Data

US 2022/0032746 A1 Feb. 3, 2022

(51) Int. Cl.

*B60J 1/20* (2006.01)
*B60N 2/00* (2006.01)
*B60K 35/00* (2006.01)
*E05F 15/71* (2015.01)
*E05F 15/73* (2015.01)

(Continued)

(52) U.S. Cl.

CPC ............. *B60J 1/2097* (2013.01); *B60K 35/00* (2013.01); *B60N 2/002* (2013.01); *E05F 15/71* (2015.01); *E05F 15/73* (2015.01); *G01L 23/08* (2013.01); *B60H 1/00735* (2013.01); *B60R 11/0247* (2013.01); *B60R 11/04* (2013.01); *B60R 2300/8006* (2013.01); *E05Y 2400/44* (2013.01);

(Continued)

(58) Field of Classification Search

CPC ........ B60J 1/2097; B60K 35/00; B60N 2/002; E05F 15/71; E05F 15/73; E05F 15/70; G01L 23/08; B60H 1/00735; B60H 1/24; B60R 11/0247; B60R 11/04; B60R 2300/8006; E05Y 2400/44; E05Y 2400/45; E05Y 2900/55

See application file for complete search history.

(56) References Cited

U.S. PATENT DOCUMENTS 10,119,321 B2 * 11/2018 Bulpitt .................... E05F 15/60
2009/0069984 A1 * 3/2009 Turner .................... E05F 15/71
701/49

(Continued)

FOREIGN PATENT DOCUMENTS

DE 102017008964 A1 3/2018

OTHER PUBLICATIONS

J. Bach "That Vibrating 'Wub Wub Wub' That Comes From Cracking One Car Window? It's Not Just You!" The Wall Street Journal (Aug. 2016) pp. 1-5.

*Primary Examiner* — Richard M Camby
(74) *Attorney, Agent, or Firm* — Frank Lollo; Eversheds Sutherland (US) LLP

(57) ABSTRACT

Systems and methods for mitigating wind throb in vehicles are disclosed herein. An example method includes detecting wind throb in a cabin of a vehicle due to opening of a first window of the vehicle, determining when a seat that is adjacent to a second window of the vehicle is unoccupied, opening the second window when the seat is determined to be unoccupied so as to compensate for the wind throb, determining that the first window has been closed, and closing the second window in response to closing of the first window.

19 Claims, 2 Drawing Sheets

100 104B 104A 130A 102 112 110 114 104C 106C 104B 106B 128B 122 124 106D 106A 104D 104A

102 Vehicle 116 Controller 118 Processor 120 Memory 122 Pressure Sensor 124 Microphone 114 HMI 126 Climate Control System 128A-128N Seat Sensor(s) 130A-130N Window Actuator(s)

(51) Int. Cl.

| | |
|---|---|
| ***G01L 23/08*** | (2006.01) |
| *B60R 11/02* | (2006.01) |
| *B60H 1/00* | (2006.01) |
| *B60R 11/04* | (2006.01) |

(52) U.S. Cl.
CPC ....... *E05Y 2400/45* (2013.01); *E05Y 2900/55* (2013.01)

(56) References Cited

U.S. PATENT DOCUMENTS

2009/0088065 A1 4/2009 Mouch et al.
2016/0234594 A1* 8/2016 Ogura .................... H04R 1/086
2017/0362877 A1* 12/2017 Bars ...................... H02P 7/2913
2019/0112861 A1* 4/2019 Wheeler ................. E05F 15/71
2019/0136604 A1 5/2019 Stebbins et al.

* cited by examiner

SYSTEMS AND METHODS FOR MITIGATING WIND THROB IN VEHICLES

BACKGROUND

Most vehicles exhibit a phenomenon called wind throb when traveling at certain speeds with only one window open. Wind throb can be caused by wind passing over the window opening in a way that matches a resonant frequency of the vehicle's cabin. Most drivers know that opening a second window may relieve the condition, and most vehicles provide the driver with control of some or all of the windows in the vehicle, allowing a single user to open and close each window individually. When a passenger in an autonomous vehicle (AV) opens their window while the vehicle is moving at a certain speed, and all other windows remain closed or substantially closed, the user may experience wind throb. Without a mechanism to adjust other windows in the AV, the user may have no means of lowering other windows to relieve the wind throb effect. Their only choices may be to endure the wind throb or raise the window.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to systems and methods for mitigating wind throb in vehicles, such as AVs. For example, an AV can be equipped with a comfort vent feature implemented by a vehicle controller, where a single passenger may press their window switch to open their window, and the vehicle controller can automatically vent a corresponding window (or windows), preventing the condition that leads to wind throb. A vehicle controller can be configured to choose a second window(s) adjacent to an unoccupied seat. A second window can be opened to an optimum vent position as determined by prior vehicle testing. When the passenger presses the switch to close their window, the second window may also close in response to prevent the second window from causing wind throb.

In some instances, the vehicle controller can selectively adjust positions of both the first window and the second window (or other windows as well) based on pressure variation parameters, such as vehicle speed, wind speed, and wind direction, just to name a few. The vehicle controller can control synchronous movement of the first window and the second window relative to an optimum vent position for the second window.

Illustrative Embodiments

Figure 1:
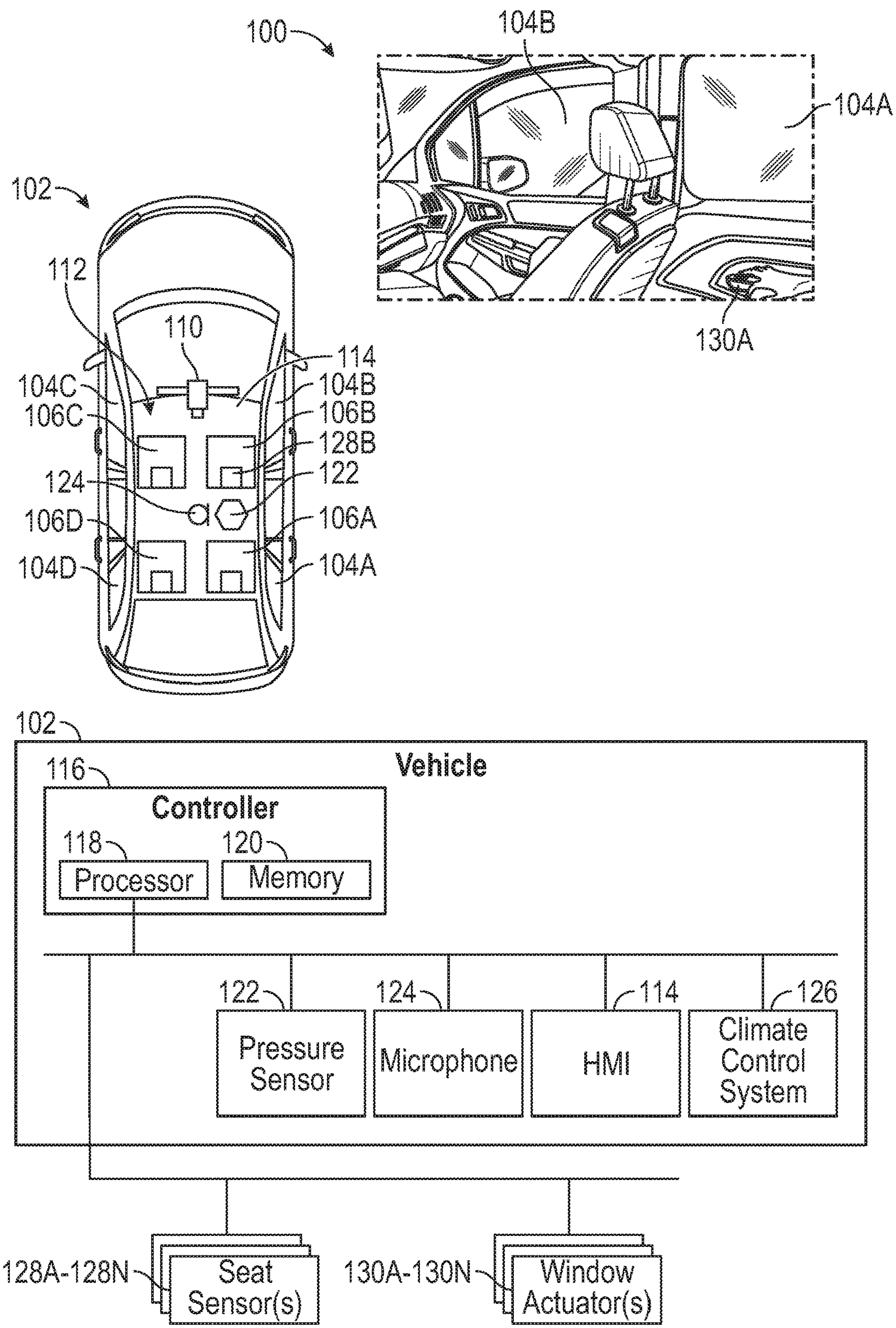
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can comprise a vehicle 102 that comprises at least two windows. The vehicle 102 of FIG. 1 includes four windows: window 104A, window 104B, window 104C, and window 104D. In some use case examples, any of these windows can be referred to as a primary or first window. Generally, the primary or first window is any window that is opened while the other windows of the vehicle remain substantially or completely closed.

As referred to herein, a vent or second window can include any of the windows that are not the primary or first window. The second window may be selected for actuation (e.g., opening) if a seat adjacent thereto is determined to be unoccupied. Thus, each of the windows 104A, 104B, 104C, and 104D can be associated with a seat. For example, window 104A is adjacent to seat 106A, window 104B is adjacent to seat 106B, window 104C is adjacent to seat 106C, and window 104D is adjacent to seat 106D. Each seat can comprise a seat sensor. The vehicle 102 can include a plurality of seat sensors 128A-128N (such as seat sensor 128B associated with seat 106B). The vehicle 102 can also comprise window actuators 130A-130N, with each window in the vehicle having at least one of the window actuators 130A-130N. A window actuator could include a switch, as an example. The vehicle 102 can include an onboard camera 110 for obtaining images of passengers within a cabin 112 of the vehicle 102. The vehicle can also include a human machine interface 114 such as a vehicle infotainment system for displaying messages related to the comfort vent features.

As noted above, the vehicle 102 can include an autonomous vehicle, but can also include a human operated vehicle. The vehicle 102 can include a controller 116 that can be configured to automatically control window operation to mitigate wind throb (also referred to as a comfort vent feature). Thus, the controller 116 can include a processor 118 and memory 120. The processor 118 executes logic stored in the memory 120 such as window operation management logic for mitigating wind throb.

The controller 116 can be configured to implement an optimum vent position for a second window of the vehicle 102 in order to mitigate wind throb. The optimum vent position can be determined by empirical testing during vehicle manufacture or design.

In one use case, the window 104A is a primary or first window that is opened by a user. Any other window, such as window 104B, in the vehicle could be considered a vent or second window that can be opened by the controller 116 to mitigate wind throb cause by opening of the window 104A. In some instances, an optimum vent position can be determined for each window in the vehicle 102, assuming at least one other window has been opened to create wind throb. For example, an optimum vent position for the window 104C to mitigate wind throb relative to opening of the window 104A may be different than an optimum vent position for window 104C to mitigate wind throb relative to the opening of window 104B or 104D.

The optimum vent position for a second window can vary based on pressure variation parameters. Thus, the controller 116 can be configured to determine various pressure variation parameters. These pressure variation parameters can include, but are not limited to, vehicle speed, wind speed, and wind direction. Each of these pressure variation parameters can directly or indirectly affect when wind throb may occur when one of the windows of the vehicle 102 is opened. The pressure variation parameters may determine if wind throb is likely to occur or not. For example, if the vehicle is traveling above a threshold velocity level, wind throb may occur. If the vehicle is traveling below the threshold velocity, wind throb may not occur. Thus, the controller 116 may not selectively open a second or vent window when the vehicle is not traveling above the threshold velocity. When vehicle velocity is high, the second window may be opened to a greater extent than when velocity is at or near the vehicle velocity threshold. In another example, a wind direction that is opposite or orthogonal to the direction of travel of the vehicle may affect wind throb. The position of the second window may be set to account for this wind direction. In some configurations, the controller 116 can adjust the position of the second window on the fly as pressure variation parameters fluctuate.

The controller 116 can be configured to sense when a window has been opened. For example, the controller 116 can sense when the window 104A has been opened. For example, the controller 116 can detect when a switch (such as window actuator 130A) of the window 104A has been actuated to open the window 104A.

The vehicle 102 can comprise an in-cabin pressure sensor 122 that can detect a cyclical change in pressure in the cabin of the vehicle 102 that is indicative of wind throb. Alternatively, the vehicle 102 can comprise an in-cabin microphone 124 that detects wind throb through audio signals captured by a microphone in the cabin 112. Thus, the controller 116 can independently assess if wind throb is being experienced in the vehicle 102 based on signals received from the in-cabin pressure sensor 122 or the in-cabin microphone 124, in addition to, or in lieu of relying on opening of the primary or first window as a trigger.

Indeed, wind throb can be determined inferentially as noted above from a presumption that with only one window down in a vehicle that wind throb is present. Alternatively, wind throb can be inferred from window position and one or more of the pressure variation parameters noted above. In yet other instances, wind throb can be determined from output of the in-cabin pressure sensor 122 and/or the in-cabin microphone 124. Various combinations of these methods can also be used.

Once a determination has been made by the controller 116 that wind throb is or might be occurring, the controller 116 can mitigate or counteract, in whole or in part, the wind throb using one or more automated window control operations. For example, the controller 116 can automatically cause a second window, such as window 104B to open. As noted above, the amount that the window can be opened can be based on the optimum vent position for the window 104B, and the optimum vent position can be based on a variety of factors as disclosed above.

The controller 116 can be configured to determine, which (if any) window(s) can be opened to compensate for wind throb based on seat occupancy. For example, if seat 106B is not occupied, the controller 116 can cause the window 104B to open. If seat 106B is occupied, the controller 116 could determine if seats 106C or 106D are occupied. If either of these seats are not occupied, the controller 116 could cause the window associated with either of these seats (e.g., windows 104C or 104D) to open. In some instances, a message can be displayed on the human machine interface 114 that indicates why another window in the vehicle is being opened. In some instances, when the controller 116 determines that multiple riders are present in the vehicle 102, the controller 116 can disable the comfort vent features disclosed herein. In some configurations, the comfort vent features are disabled only when all seats are determined to be occupied. In an autonomous vehicle configuration, the controller 116 can determine current occupancy based on a ride-hailing scheduling.

If no seat is open, the controller 116 can be configured to cause a climate control system 126 of the vehicle 102 to activate. For example, the controller 116 can activate a fan or air-conditioner functionality of the climate control system 126. In some instances, a message can be displayed on the human machine interface 114 that the window should not be activated and that this is being recommended to prevent wind throb.

Figure 2:
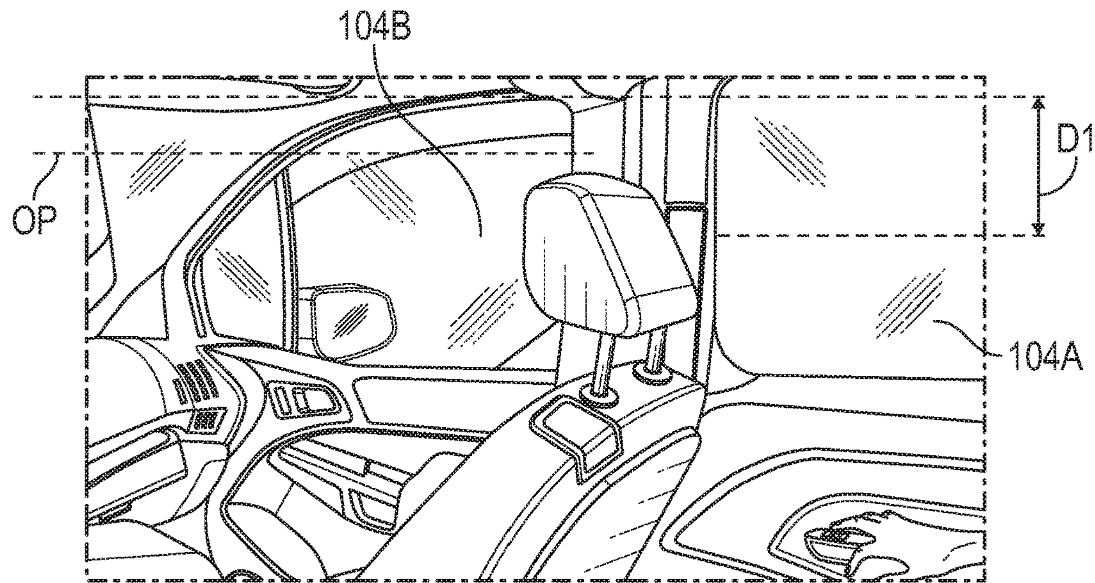
FIG. 2 illustrates controlling the movement of a vent or second window in response to activation of primary or first window.

The controller 116 can be configured to provide more granular or context-specific window control. For example, when two windows have been opened, by virtue of automatic control or otherwise, the controller 116 can be configured to allow a user to independently operate a window so that it can be opened more than the optimum vent position. That is, independent operation of a window by a user can be preserved. For example, as illustrated in FIG. 2, window 104A has been opened and window 104B has been opened to its optimum vent position. If window 104A is further opened so as to be opened to a greater extent than an optimum vent position OP for window 104B, the controller 116 may be configured to delay closing of window 104B until window 104A is closing and has ascended to the optimum vent position OP for the second window 104B. For example, window 104A is set below the optimum vent position OP of window 104B by a distance D1.

In sum, when the first window and the second window are opened to a predetermined level (e.g., optimum vent position) and the first window is opened more than the predetermined level and the first window is commanded to be closed, controller 116 can cause the second window to move in tandem with the first window when the first window reaches the predetermined or optimum level. That is, the controller 116 can cause the second window to stop opening once it reaches the predetermined level, but the first window can be allowed to open as desired by the user. Once window 104A is closed so that it reaches the optimum vent position OP, the controller 116 can cause window 104A and window 104B to travel in synchronization until both are substantially or completely closed. In general, similarly to synchronous opening of a second window in response to opening of a first window, the controller 116 can be configured to close a second window in response to the closing of a first window.

Figure 3:
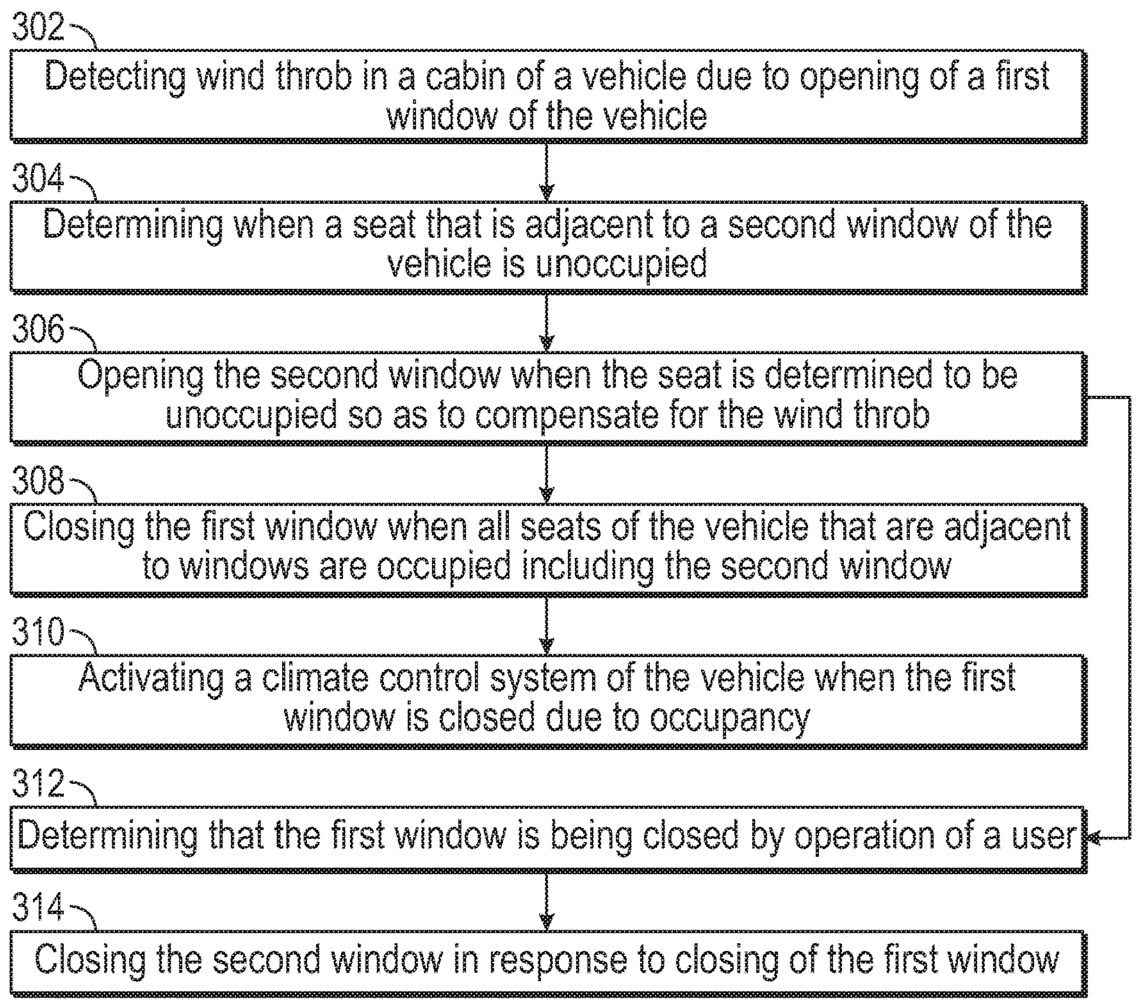
FIG. 3 is a flowchart of an example method of the present disclosure.

FIG. 3 is a flowchart of an example method of the present disclosure. The method can include a step 302 of detecting wind throb in a cabin of a vehicle due to opening of a first window of the vehicle. As noted above, various methods for inferring or empirically determining wind throb can be used. The method can include a step 304 of determining when a seat that is adjacent to a second window of the vehicle is unoccupied. If any seat of the vehicle is unoccupied, the method can include a step 306 of opening the second window when the seat is determined to be unoccupied so as to compensate for the wind throb. Alternatively, if all seats are determined to be occupied, the method can include a step 308 of closing the first window when all seats of the vehicle that are adjacent to windows are occupied including the second window, as well as a step 310 of activating a climate control system of the vehicle when the first window is closed due to occupancy. The method can include a step 312 of determining that the first window is being closed by operation of a user, as well as a step 314 of closing the second window in response to closing of the first window.

Referring back to FIG. 1, the controller 116 can also be configured to operate windows of the vehicle in various scenarios or use cases. For example, the controller 116 can be configured to open and/or close windows in response to actuation of one of the windows by a control mechanism such as a switch. In another scenario, if the vent window is closed but the primary window reverses direction such that the primary window is open, the user can close the primary window using the control mechanism. The vehicle can remain in an active comfort vent mode. In a ride-hailing scenario, when the controller 116 determines that a second or more customers have been picked up, the controller 116 can disable the comfort vent mode.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:

detecting wind throb in a cabin of a vehicle due to opening of a first window of the vehicle;

determining when a seat that is adjacent to a second window of the vehicle is unoccupied;

opening the second window when the seat is determined to be unoccupied to compensate for the wind throb;

determining that the first window is being closed; and closing the second window in response to closing of the first window, wherein the first window and the second window are opened a predetermined level, further wherein when the first window is opened more than the predetermined level and the first window is closed, the second window is caused to move in tandem with the first window when the first window reaches the predetermined level.

2. The method according to claim 1, wherein detecting wind throb includes determining when the first window is an only window open, the vehicle comprising a plurality of windows that include at least the first window and the second window.

3. The method according to claim 1, wherein detecting wind throb includes determining any of a wind speed, wind direction, and a velocity of the vehicle.

4. The method according to claim 1, wherein detecting wind throb includes detecting a cyclical change in pressure that is indicative of wind throb or detecting wind throb through audio signals captured by a microphone in the cabin.

5. The method according to claim 1, further comprising closing the first window when all seats of the vehicle that are adjacent to windows are occupied including the second window.

6. The method according to claim 5, further comprising activating a climate control system of the vehicle when the first window is closed.

7. A device, comprising:

a processor; and a memory for storing instructions, the processor executing the instructions to:

detect opening of a first window of a vehicle;

determine when a seat that is adjacent to a second window of the vehicle is unoccupied;

open the second window when the seat is determined to be unoccupied so as to compensate for wind throb caused by opening of the first window;

determine that the first window has been closed; and close the second window in response to closing of the first window.

8. The device according to claim 7, wherein the second window of the vehicle is determined to be unoccupied based on signals received from a seat sensor associated with the seat.

9. The device according to claim 7, wherein the processor is configured to:

determine any of a wind speed and a velocity of the vehicle that would cause the wind throb if the first window of the vehicle is opened;

determine that all seats including the seat are occupied; and preventing the opening of the first window of the vehicle or closing the first window of the vehicle when the first window is open and the wind speed or the velocity are sufficient to cause the wind throb.

10. The device according to claim 9, wherein the processor is configured to allow the first window to be opened when either the wind speed or the velocity are below a threshold level.

11. The device according to claim 7, wherein the processor is configured to close the first window when all seats of the vehicle that are adjacent to windows are occupied including the second window.

12. The device according to claim 11, wherein the processor is configured to activate a climate control system of the vehicle when the first window is closed.

13. The device according to claim 7, wherein when the first window and the second window are opened a predetermined level, further wherein when the first window is opened more than the predetermined level and the first window is closed, the processor is configured to cause the second window to move in tandem with the first window when the first window reaches the predetermined level.

14. An autonomous vehicle, comprising:

a first seat adjacent to a first window;

a second seat adjacent to a second window; and a controller comprising a processor and memory for storing instructions, the processor being configured to execute the instructions to:

detect opening of the first window of the vehicle;

determine when the second seat that is adjacent to the second window of the vehicle is unoccupied; and open the second window when the seat is determined to be unoccupied so as to compensate for wind throb caused by opening of the first window.

15. The autonomous vehicle according to claim 14, further comprising displaying a message on a human machine interface of the vehicle that explains that the second window is being opened to compensate for the wind throb.

16. The autonomous vehicle according to claim 14, wherein occupancy of the second seat is determined based on:

sensor signals of a seat sensor associated with the second seat; or images obtained from an on-board camera within a cabin of the vehicle.

17. The autonomous vehicle according to claim 14, wherein the processor is configured to close the first window when all seats of the vehicle that are adjacent to windows are occupied including the second window.

18. The autonomous vehicle according to claim 14, wherein the processor is configured to selectively open or close the first window and the second window based on pressure variation parameters, wherein the pressure variation parameters comprise any of vehicle speed, wind speed, and wind direction.

19. The autonomous vehicle according to claim 14, wherein when the first window and the second window are opened a predetermined level, further wherein when the first window is opened more than the predetermined level and the first window is closed, the processor is configured to cause the second window to move in tandem with the first window when the first window reaches the predetermined level.

* * * * *